(12) United States Patent
Litter

(10) Patent No.: US 7,648,152 B1
(45) Date of Patent: Jan. 19, 2010

(54) MOTORCYCLE KICKSTAND ACCESSORY

(76) Inventor: Matt Litter, 656 Hospital Rd., Chillicothe, OH (US) 45601

( * ) Notice: Subject to any disclaimer, the term of this patent is extended or adjusted under 35 U.S.C. 154(b) by 0 days.

(21) Appl. No.: 12/146,570

(22) Filed: Jun. 26, 2008

(51) Int. Cl.
*B62H 7/00* (2006.01)
(52) U.S. Cl. ............... 280/293; 280/763.1; 248/188.9
(58) Field of Classification Search ........... 280/293, 280/763.1; 16/42 R, 42 T; 248/188.9; 40/607.15, 40/611.01; D6/582
See application file for complete search history.

(56) References Cited

U.S. PATENT DOCUMENTS

| 3,712,640 | A | * | 1/1973 | Shipman et al. | 280/301 |
|---|---|---|---|---|---|
| 3,955,829 | A | * | 5/1976 | Bussler | 280/301 |
| 4,474,387 | A | * | 10/1984 | Maranell et al. | 280/293 |
| 4,521,031 | A | * | 6/1985 | Huth | 280/293 |
| 4,768,800 | A | * | 9/1988 | Johns | 280/293 |
| 5,257,803 | A | * | 11/1993 | Fisher | 248/346.01 |
| 5,351,981 | A | * | 10/1994 | Thomas | 280/301 |
| 6,257,419 | B1 | * | 7/2001 | Kamysiak | 211/22 |
| 6,643,965 | B2 | * | 11/2003 | Toraby-Payhan | 40/600 |
| 6,669,221 | B2 | * | 12/2003 | Leppke et al. | 280/295 |
| 6,915,993 | B2 | * | 7/2005 | O'Leary | 248/188.9 |
| D507,994 | S | * | 8/2005 | Bacon | D12/120 |
| 7,028,808 | B2 | * | 4/2006 | Zeaman | 182/108 |
| D530,649 | S | * | 10/2006 | Hoskins | D12/120 |
| D563,837 | S | * | 3/2008 | Irwin et al. | D12/120 |
| 7,350,324 | B2 | * | 4/2008 | Wu | 40/320 |
| D585,227 | S | * | 1/2009 | Kaczmarczyk, Jr. | D6/582 |
| 2002/0014766 | A1 | * | 2/2002 | Leppke et al. | 280/763.1 |
| 2002/0163160 | A1 | * | 11/2002 | Golemba | 280/301 |
| 2004/0262880 | A1 | * | 12/2004 | McClure | 280/293 |

* cited by examiner

*Primary Examiner*—Lesley Morris
*Assistant Examiner*—Tashiana Adams
(74) *Attorney, Agent, or Firm*—Porter, Wright, Morris & Arthur, LLP

(57) ABSTRACT

An accessory adapted to be affixed to a motorcycle kickstand comprising a pad and at least one bracket removably attachable to the pad at a top of each channel wall by at least one fastener. The pad comprises a channel formed between opposing channel walls extending vertically from either longitudinal side of the pad, and a bottom side. The bottom side comprises a tread and provides support and a barrier that prevents the kickstand from marring a surface when a force is applied to the deployed kickstand.

10 Claims, 7 Drawing Sheets

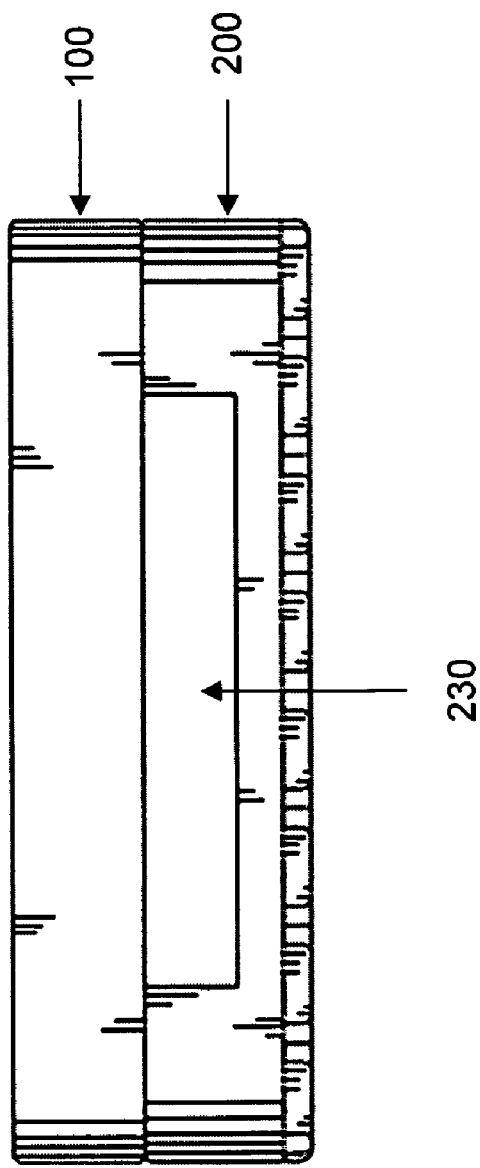
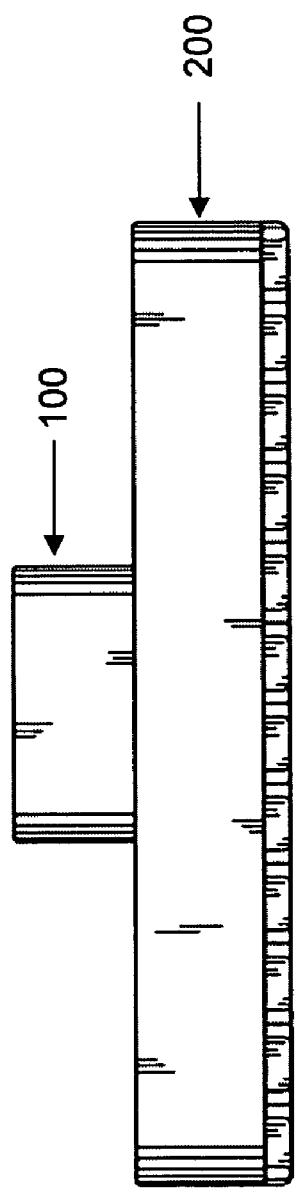
FIG. 3
FIG. 4

MOTORCYCLE KICKSTAND ACCESSORY

FIELD OF THE INVENTION

The present invention relates generally to a motorcycle kickstand accessory and more particularly to an accessory that provides protection to a surface and support for the motorcycle when attached to the kickstand.

BACKGROUND OF THE INVENTION

Motorcycle kickstands are typically fabricated from a metal material, such as steel or aluminum, and bear a portion of the weight of the motorcycle when the kickstand is deployed. Due to the weight of the motorcycle being transferred to the metal kickstand, several problems arise when the kickstand is deployed on a soft or finished surface. When deployed in sand or soft soil, the kickstand sinks from the weight of the motorcycle, which may cause the motorcycle to fall over and be damaged. When deployed on asphalt in warm temperatures, the kickstand may make an imprint in the asphalt. When deployed on a finished surface, such as marble, linoleum, wood, tile, concrete and the like, any movement of the motorcycle can mar or gouge the finished surface.

Existing kickstand supports or pads provide some relief to these problems, but existing kickstand pads that provide adequate support typically do not prevent damage to a finished surface. Existing pads are typically made from metal, and easily mar finished surfaces. Many support pads must be removed from the kickstand prior to moving the kickstand to a stored position. Many pads that provide protection to a surface are not connected to the motorcycle and must be positioned and retrieved when parking the motorcycle. Some pads that are connected to the kickstand that support a motorcycle on soft soil are cleated, which causes damage to a finished surface when the kickstand is deployed there. On the other hand, existing pads to prevent scuffing may protect a surface but do not allow for easy movement of the motorcycle. Existing pads may allow the kickstand to slide on the surface when a rider sits on the motorcycle, thus marring the surface.

The need exists for an inexpensive, affixed, lightweight but durable motorcycle kickstand support pad that offers support for the motorcycle on soft surfaces as well as protection to finished surfaces on which the motorcycle is placed.

BRIEF SUMMARY OF THE INVENTION

The present invention is an accessory adapted to be affixed to a motorcycle kickstand. The present invention comprises a pad and at least one bracket removably attachable to a top of channel walls of the pad by at least one fastener. The pad comprises a channel formed between opposing channel walls extending vertically from either longitudinal side of the pad and a bottom side that comprises a tread. When a force is applied to the deployed kickstand, the bottom side provides support and a barrier that prevents the kickstand from marring a surface upon which the pad rests. The pad and the bracket are formed of a relatively hard noncompressible material. In an embodiment, the pad and the bracket are formed of a thermoplastic rubber. In an embodiment, the pad and the bracket are formed from a resin having a Shore A hardness of about 55 to about 90. In an embodiment, the pad is formed from a resin having a Shore A hardness of about 73.

In an embodiment, a top side of the bracket comprises a logo. In an embodiment, the logo is removeably attachable. In an embodiment, the bottom side comprises a logo. In an embodiment both the top side of the bracket and the bottom side of the pad comprise a logo.

In an embodiment, the pad is about 3 inches from a first side to a second side and a first opposing channel wall is about 2 inches from a second opposing channel wall.

In an embodiment, the accessory is made by subjecting a thermoplastic rubber to press forming. In an embodiment, the accessory is used comprising the steps of 1) placing the pad on a surface, 2) deploying the kickstand so that a portion of a bottom surface of the kickstand is positioned on the channel, 3) attaching the bracket, and 4) selecting and affixing a logo. The logo may be removed and replaced by a new logo.

The present invention provides an inexpensive, removably affixed, lightweight and durable motorcycle kickstand support pad. An important aspect and objective of the present invention is the provision for a motorcycle kickstand accessory that combines support for the motorcycle on soft surfaces as well as protection from scuffing to finished surfaces. The present invention provides a removably affixed support pad so that the pad may be replaced when required. The present invention provides a kickstand accessory that grips a smooth surface without causing damage to the surface when the kickstand moves on the surface. The present invention provides a support pad capable of remaining on the kickstand so as to improve the ease of use of the device. The present invention provides a customizable section to attach a logo of the user's choice. These, as well as other features and advantages of the present invention will become apparent from the following more detailed description, taken in conjunction with the accompanying drawings, which illustrate, by way of example, the principles of the invention.

As used herein, "approximately" means within plus or minus 25% of the term it qualifies. The term "about" means between ½ and 2 times the term it qualifies.

All percentages, parts and ratios as used herein are by weight of the total composition, unless otherwise specified. All such weights as they pertain to listed ingredients are based on the active level and, therefore, do not include other products that may be included in commercially available materials, unless otherwise specified.

The compositions of the present invention can comprise, consist of, or consist essentially of the essential elements and limitations of the invention described herein, as well as any additional or optional ingredients, components, or limitations described herein or otherwise useful in compositions of the general type as described herein.

Numerical ranges as used herein are intended to include every number and subset of numbers contained within that range, whether specifically disclosed or not. Further, these numerical ranges should be construed as providing support for a claim directed to any number or subset of numbers in that range or to be limited to the exact conversion to a different measuring system, such, but not limited to, as between inches and millimeters.

All references to singular characteristics or limitations of the present invention shall include the corresponding plural characteristic or limitation, and vice versa, unless otherwise specified or clearly implied to the contrary by the context in which the reference is made.

BRIEF DESCRIPTION OF THE DRAWING

The accompanying drawings illustrate the present invention. In such drawings:

FIG. 3 is a side view of an embodiment of the motorcycle kickstand accessory.

FIG. 4 is a second side view of an embodiment of the motorcycle kickstand accessory.

Figure 1:
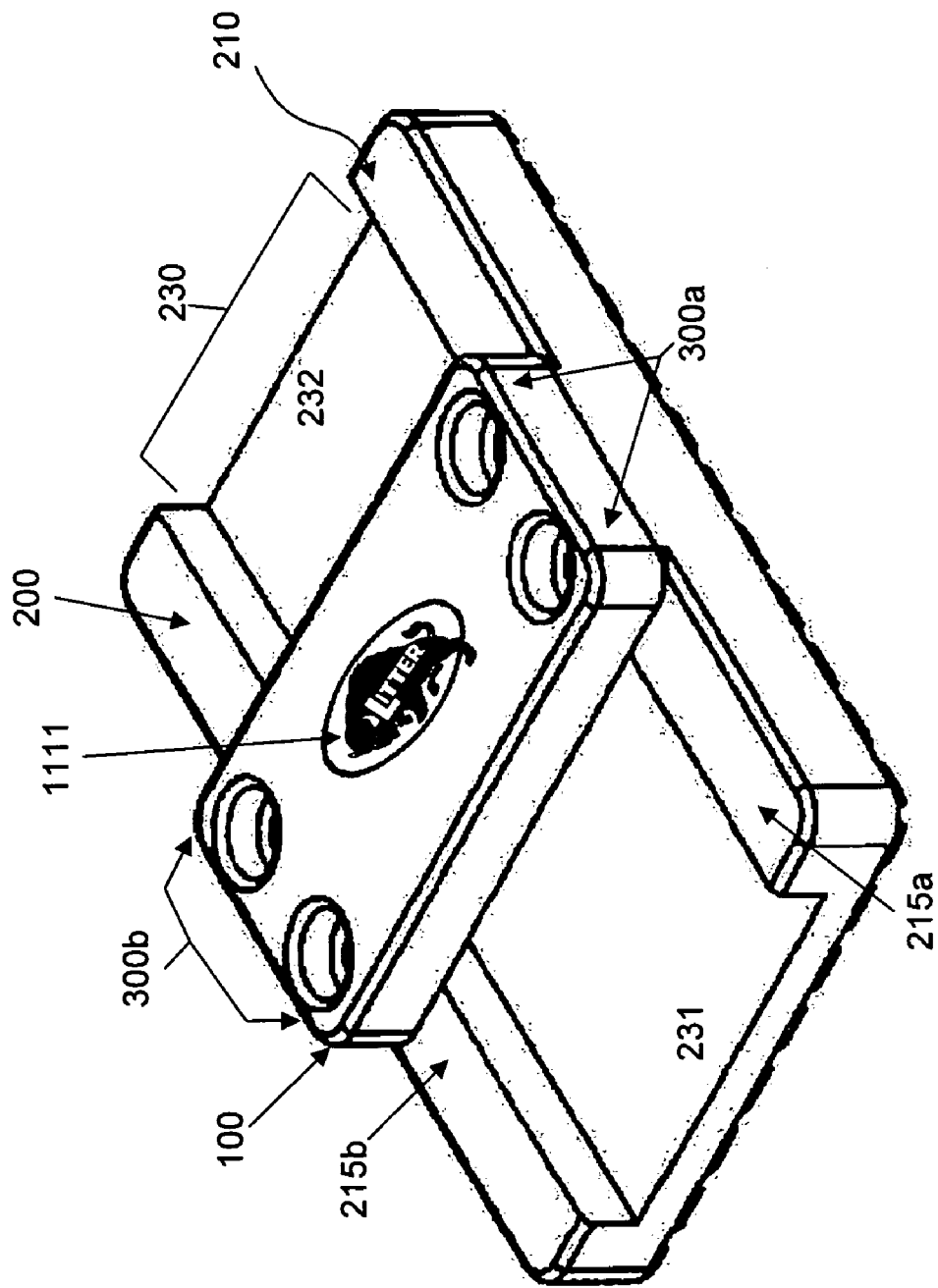
FIG. 1 is a perspective view of an embodiment of the motorcycle kickstand accessory.

It should be understood that the appended drawings are not necessarily to scale, presenting a somewhat simplified representation of various preferred features illustrative of the basic principles of the invention. The specific design features of the metal shingle as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. For example, certain features may be enlarged for clarity or illustration. All references to direction and position, unless otherwise indicated, refer to the orientation of the metal shingle and roofing system as illustrated in the drawings. In general, up or above generally refers to an upward direction within the plane of the paper in FIG. 1 and down or below generally refers to a downward direction within the plane of the paper in FIG. 1.

DETAILED DESCRIPTION OF THE INVENTION

Referring now to the drawings, FIG. 1 depicts an embodiment of the motorcycle kickstand accessory. As shown in FIG. 1, the accessory comprises a bracket 100 and a pad 200.

Figure 2:
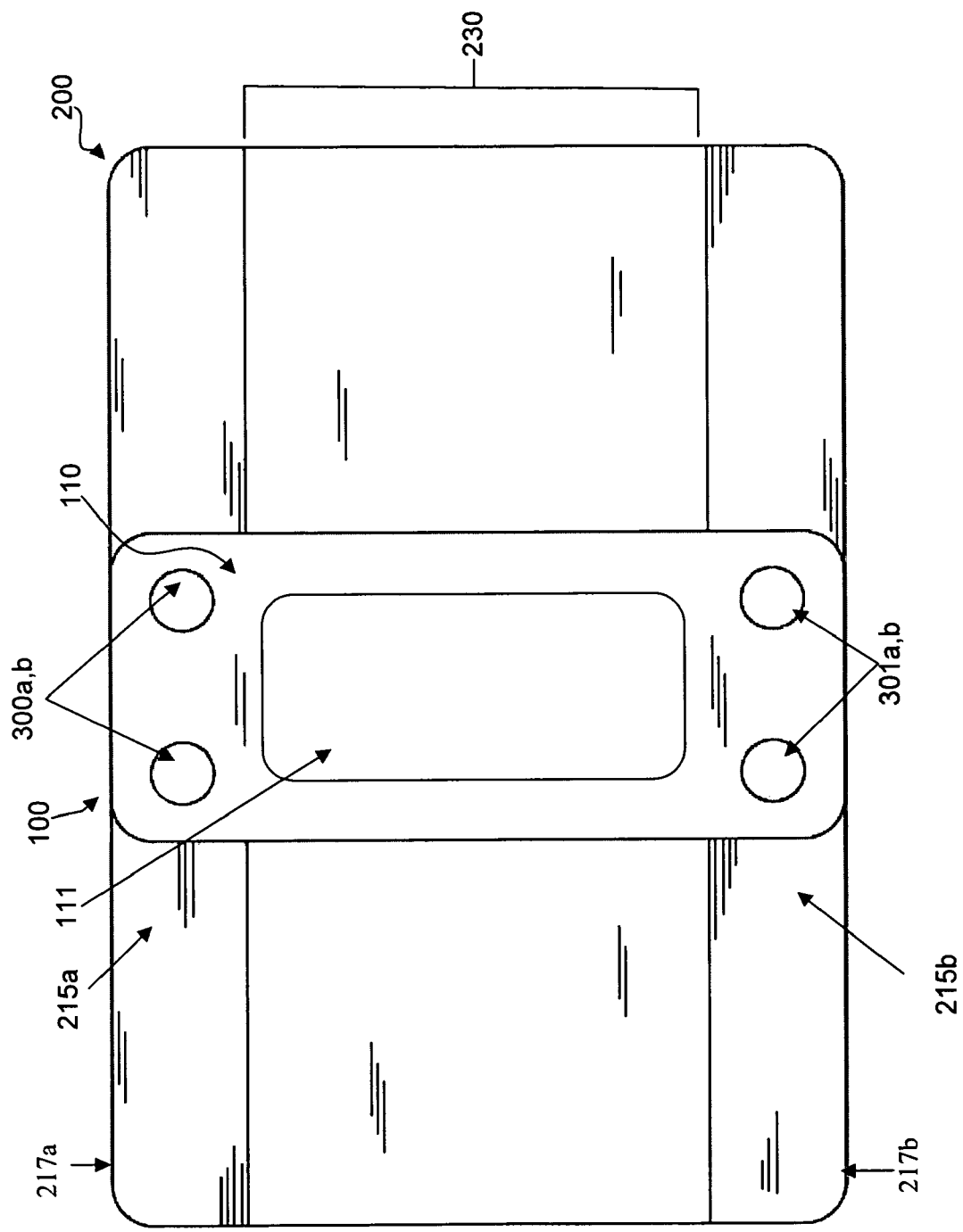
FIG. 2 is the top view of an embodiment of the motorcycle kickstand accessory.

Referring now to FIG. 2, The bracket 100 comprises an upper surface 110. In an embodiment, the bracket 100 is generally a cube shape, having a bottom surface opposite the upper surface and opposite sides. In an embodiment, the upper surface 110 comprises a logo section 111. The logo section is formed such that a symbol (an example is shown in FIG. 1 at 1111) or other graphic may be attached to the logo section 111. The symbol may be attached by any means, such as molding upon formation of the accessory, or as an after market addition, such as a sticker, button, rivet, pin, and the like.

Figure 5:
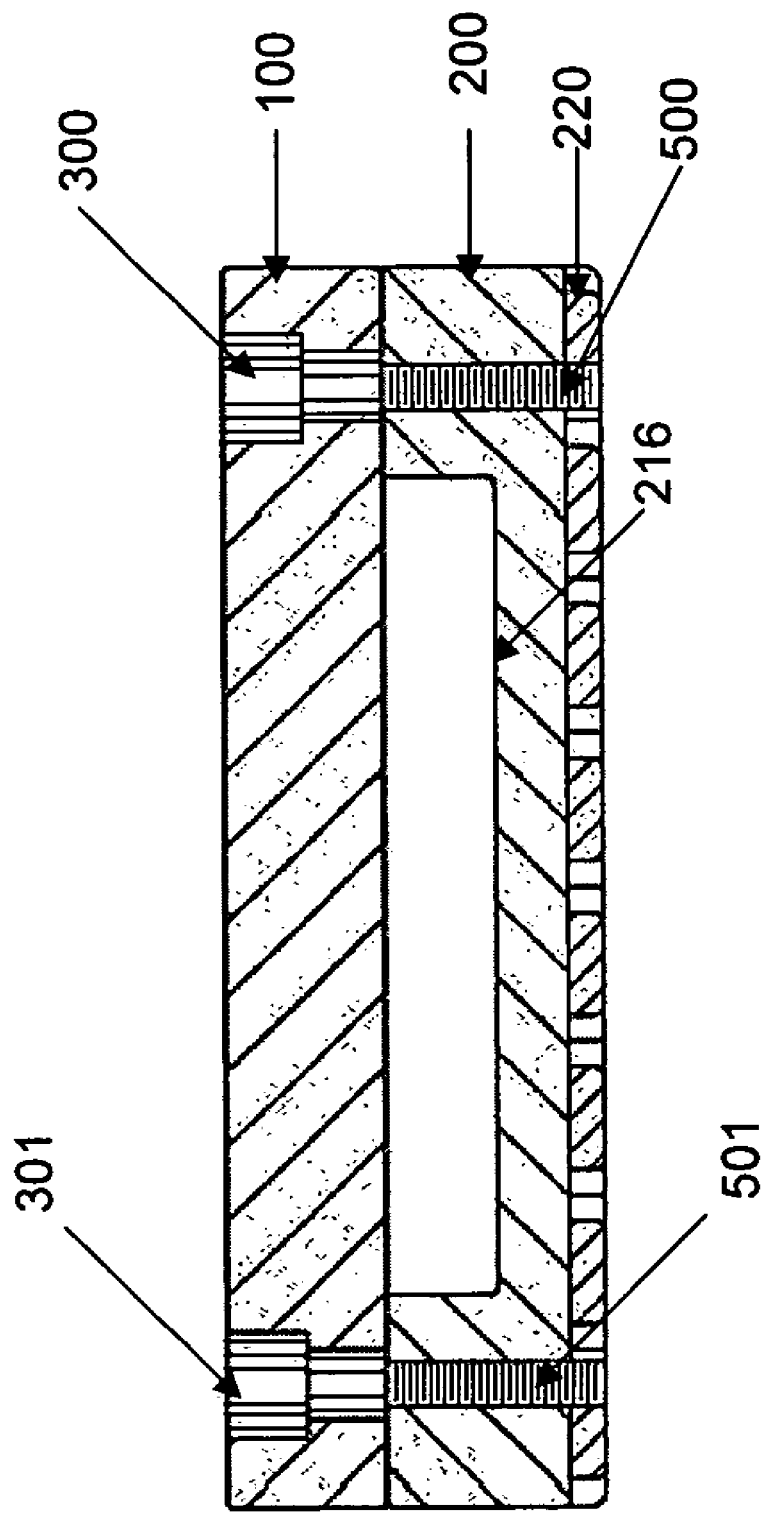
FIG. 5 is a cross sectional view of an embodiment of the motorcycle kickstand accessory.
Figure 6:
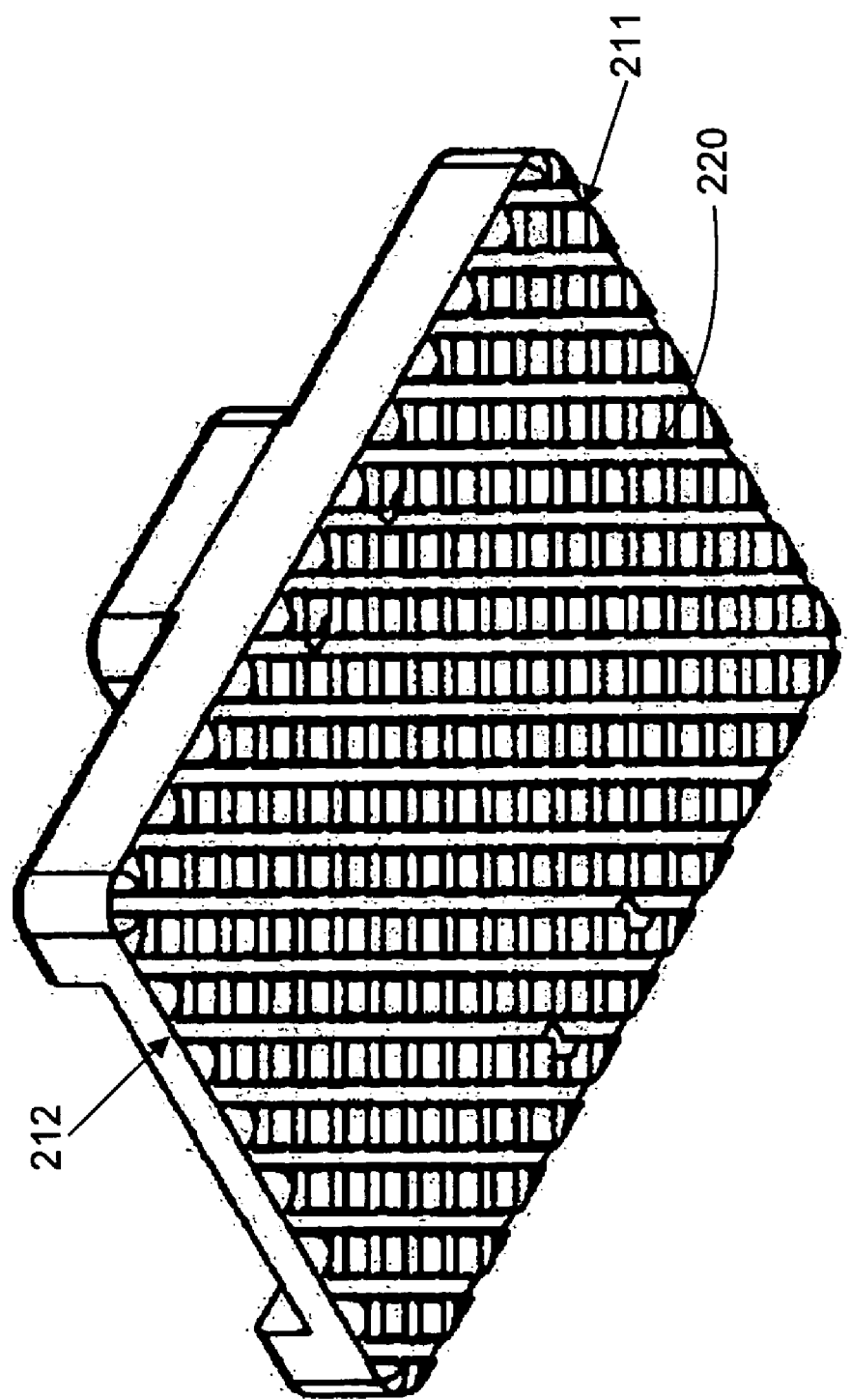
FIG. 6 is a bottom perspective view of an embodiment of the motorcycle kickstand accessory.

The pad 200 comprises an upper side 210 and an underside 220 (best seen in FIGS. 5 and 6). The upper side 210 comprises a channel 230 that extends from a first end 231 to a second end 232 of the upper side 210. The channel 230 is formed between opposing channel sides 215a, 215b each of which run the length of the upper side 210. In an embodiment a top corner of each opposing channel sides 215a, 215b is rounded. In an embodiment depicted in FIG. 5, the channel sides 215a, 215b extend from a floor 216 of the channel about 0.15 to about 0.3 inches.

In an embodiment, the pad 200 is approximately 3 inches from a first side to the second side. In an embodiment, the pad 200 is approximately 2 inches from an outer wall 217a of the first channel side 215a to an outer wall 217b of the second channel side 215b.

In an embodiment, the bracket 100 is connected to the pad 200 at the points 300, 301. In an embodiment, the bracket 100 is connected to the pad at least at the points 300a, 300b and 301a, 301b. In an embodiment, the points 300a, 300b and 301a, 301b are at about a mid-portion of each channel side 215a, 215b.

As shown in FIG. 3, a first length of the bracket 100 extends from the channel sides 215a, 215b. As shown in FIG. 4, a second length of the bracket 100 extends over a portion of the length of the channel 230. In an embodiment, the second length of the bracket 100 extends approximately ¼ to ⅓ of the length of the channel 230. In an embodiment a center point of the second length of the bracket is aligned to a center point of the length of the channel 230.

Figure 7:
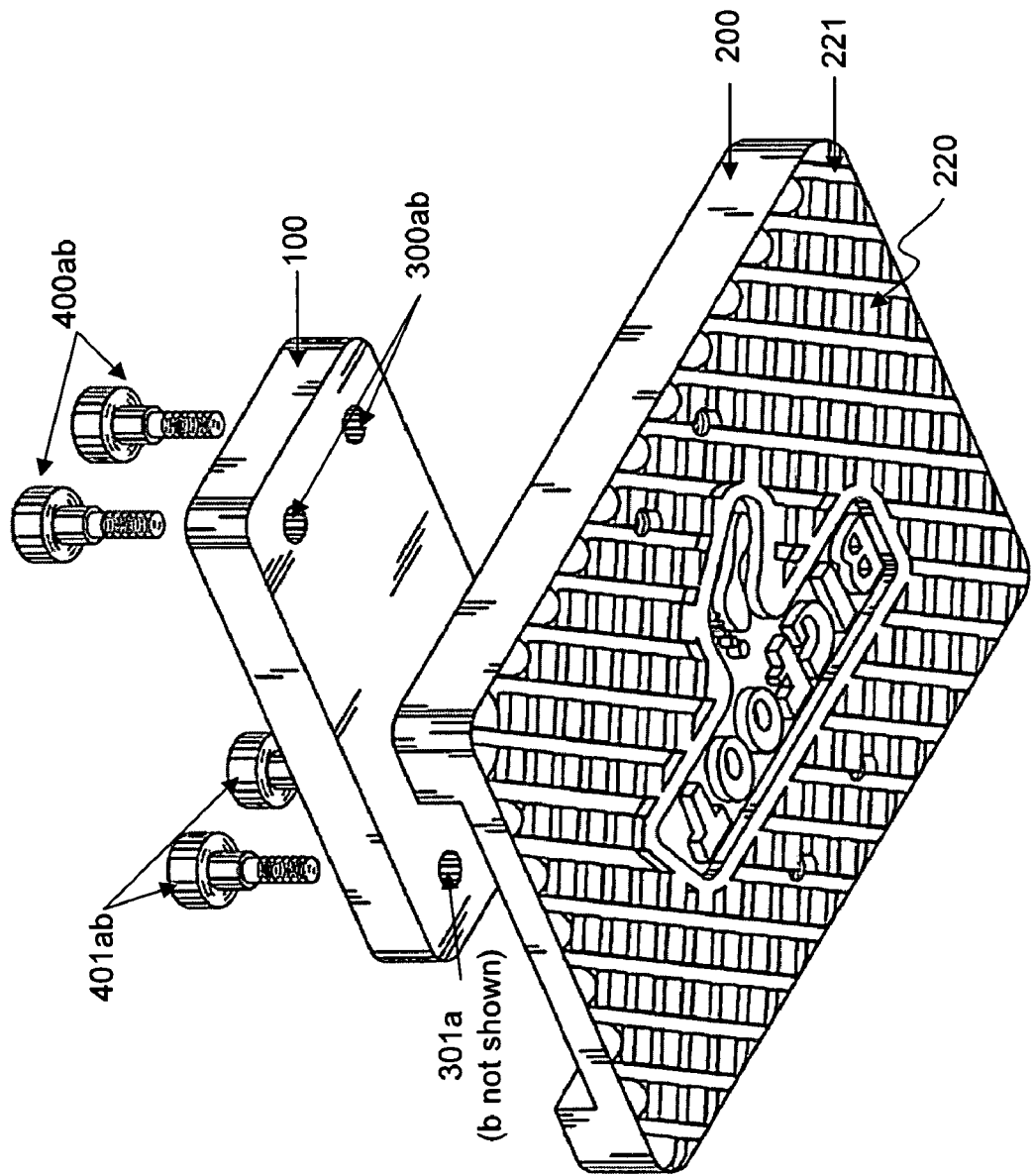
FIG. 7 is an exploded view of an embodiment of the motorcycle kickstand accessory.

Referring to the embodiment shown in FIG. 5, the bracket 100 is removably connected to the pad with at least one fastener, such as a nail, a screw, a staple, a rivet, an adhesive, and the like. In an embodiment, the fasteners are any device that permit the attachment and removal of the bracket as needed. In an embodiment, the bracket 100 is connected to the pad 200 at points 300ab, 301ab using at least one fastener at each point. In an embodiment, the bracket 100 is connected to the pad 200 at points 300ab, 301ab using two screws 400ab, 410ab at each point 300ab, 301ab (as best seen in FIG. 7). In an embodiment, the pad 200 comprises at least one preformed receptor 500ab, 510ab adapted to receive a portion of the fastener. In an embodiment, at least one preformed section 500ab, 510ab of the pad 200 is aligned with each point 300ab, 301ab to receive a portion of each screw 400ab, 410ab. The fasteners are of any length necessary to secure the bracket to the pad and to maintain the attachment when the kickstand is retracted and deployed. The fasteners may extend to the underside 220 of the pad (described below), but do not extend beyond the tread as to prevent scuffing of a floor by the fasteners if the motorcycle is moved while the kickstand, with the accessory attached, is deployed.

Referring to FIG. 6, the pad 200 comprises an underside 220. In an embodiment, the underside 220 comprises an irregular surface 221. In an embodiment, the underside 220 comprises a pattern molded into the irregular surface. In an embodiment, the underside comprises an irregular surface 221 and a logo, which may be the same or different from the logo 1111. In an embodiment, the irregular surface 221 is any design that provides friction points when in contact with a resting surface, such as a floor, deck, road surface, sidewalk, ground, gravel, sand and the like. The irregular surface 221 minimizes the amount of surface area in contact with the ground or floor. In an embodiment, the irregular surface 221 comprises a tread having at least one cut, dimple and or nub. In an embodiment, the irregular surface is molded, stamped, milled or formed in any other conventional manner on the bottom side of the pad. In an embodiment, the pad 200 is shaped such that the first end 211 and the second end 212 are in the same plane.

The kickstand accessory of the present invention is made from at least a polymer, rubber, or similar material. In an embodiment, the accessory is made from a thermoplastic rubber, although any other similar light weight and formable resilient material that is easy to process and easy to clean, is chemical resistance to both acids and alkalis, and provides high strength, low viscosity, flexibility and durability may be used. Acceptable construction materials are those having a usable temperature range from about −51 to about 135 degrees C. Examples of construction materials include Santoprene® thermoplastic rubber, (Advanced Elastomer Systems, an affiliate of ExxonMobil Chemical), Sarlink® thermoplastic elastomer (DSM Thermoplastic Elastomers, Inc.), Vichem® thermoplastic elastomer (Vichem Corp.) and Kraton® polymer (Kraton Polymers LLC).

In an embodiment, a first component of the accessory is formed from a different polymer, rubber, or similar material than a second component. In an embodiment, a layer or section of a component of the accessory is formed from a different polymer, rubber, or similar material than a second layer or section of that component.

The fasteners are made from any material that provides sufficient mechanical coupling means and withstands the force exerted on the accessory when the kickstand is deployed and an extra force, such as a rider sitting on the motorcycle, is added. In an embodiment, the fastener is a screw that creates resistance to vibrational loosening, such as, but not limited to, Plastite® #6 Pan Head (manufactured by McMaster Carr).

In an embodiment, the base material of at least one component of the accessory comprises an additive. In an embodiment, at least one of an antioxidant, a ultra violet stabilizer, carbon black, a processing aid, a colorant, and the like is added to the material prior to forming the accessory.

The accessory can be formed in a variety of ways, including but not limited to blow molding, injection molding, extrusion, stamping and the like. In an embodiment the accessory is formed by press molding. In an embodiment, the accessory is formed so that the resulting hardness of the accessory ranges from slightly flexible to firm. In an embodiment, the accessory is formed from a resin with a resulting hardness of between about 55 to about 90 Shore A hardness. In an embodiment, the accessory is formed from a thermoplastic rubber with a resulting hardness of between about 70 to about 80 Shore A hardness. In an embodiment, the accessory is formed from a resin with a resulting hardness of about 73 Shore A hardness. In an embodiment, the pad and bracket are formed from a resin with the same Shore A hardness. In an embodiment, the pad is formed from a resin with a resulting Shore A hardness that is greater than the Shore A hardness of the bracket. Having the pad harder than the bracket enables the pad, when pressed on by the kickstand, to maintain its rigidity and provide a stable surface to distribute the weight of the motorcycle. Having a bracket of a lesser hardness allows the bracket to flex slightly when the kickstand is deployed so that the accessory is held tightly to the kickstand.

Figure 8:
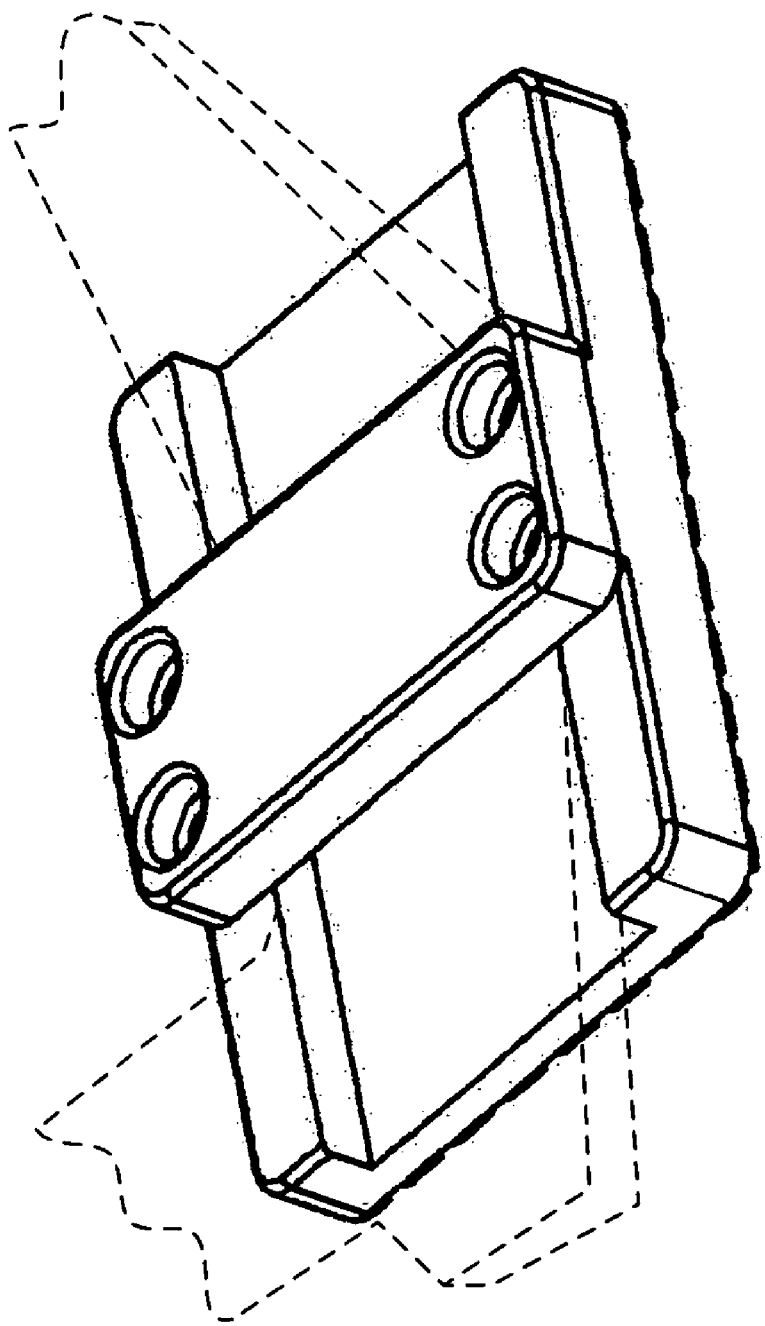
FIG. 8 is a perspective view of an embodiment of the invention as attached to a motorcycle kickstand (shown as a broken line).

FIG. 8 depicts the present invention as attached to a kickstand (of a motorcycle (dotted line). The kick stand accessory of the present invention allows a user to attach the accessory to the kickstand of a motorcycle so that the kickstand, when deployed, does not gouge the floor when the motorcycle is at rest or moved dragging the kickstand. To removeably attach the accessory to a kickstand, a user (1) places the pad 200 on a surface, (2) deploys the kickstand so that a portion of the bottom of the kickstand is positioned on the channel 230 (as depicted in FIG. 8), and (3) attaches the bracket 100. The user may select an accessory based on a pre-fixed logo. Alternatively, a user selects one or more logo to attach to the bracket at any time. Logos are removable, reusable and replaceable.

When the accessory is attached to a motorcycle kickstand and the kickstand is deployed, the pad provides a removably attached durable resting surface that adds stability when the kickstand is deployed on a soft surface. The tread provides improved gripping or traction for resistance to slipping on wet or slick surfaces. When deployed on a finished surface, the accessory provides cushion between the surface and the metal kickstand to prevent marring or gouging of the finished surface.

The present invention attaches to a kickstand so that the accessory does not interfere with the rider or the storage of the kickstand when not in use, but is immediately positioned when parking the motorcycle. The present invention allows movement of the kickstand, when the accessory is attached with out scuffing a finished surface. An advantage of the current invention is the addition to motorcycles in a dealer's showroom to allow a potential customer to sit on a parked motorcycle on the floor without damage to the surface.

One skilled in the art will understand that the description of the present invention herein is presented for purposes of illustration and that the design of the present invention should not be restricted to only one configuration or purpose, but rather may be of any configuration or purpose which essentially accomplishes the same effect.

The foregoing descriptions of specific embodiments and examples of the present invention have been presented for purposes of illustration and description. They are not intended to be exhaustive or to limit the invention to the precise forms disclosed, and obviously many modifications and variations are possible in light of the above teachings. It will be understood that the invention is intended to cover alternatives, modifications and equivalents. The embodiments were chosen and described in order to best explain the principles of the invention and its practical application, to thereby enable others skilled in the art to best utilize the invention and various embodiments with various modifications as are suited to the particular use contemplated.

It is therefore to be understood that within the scope of the appended claims, the invention may be practiced otherwise than as specifically described herein.

What is claimed is:

1. An accessory adapted to be affixed to a motorcycle kickstand comprising:
    a pad comprising: (1) a channel formed between opposing channel walls extending vertically from an upper side of the pad, said channel extending from a first longitudinal end to a second longitudinal end of the upper side of the pad, and (2) a bottom side, said bottom side, when a force is applied to the deployed kickstand, providing support and a barrier that prevents the kickstand from marring a surface, said bottom side comprising a tread, and
    at least one bracket removably detachable and attachable to a top of each channel wall by at least one fastener; said bracket centered longitudinally on the pad and extending from about ¼ to about ⅓ of the longitudinal length of the channel such that accessory is attachable to the kickstand with either the first longitudinal end or the second longitudinal end adjacent to a distal end of the kickstand.

2. The accessory of claim 1 wherein the pad and the bracket are formed of a relatively hard noncompressible material.

3. The accessory of claim 1 wherein the pad and the bracket are formed of a thermoplastic rubber.

4. The accessory of claim 1 wherein the pad and the bracket are formed from a resin having a Shore A hardness of about 55 to about 90.

5. The accessory of claim 1 wherein the pad is formed from a resin having a Shore A hardness of about 73.

6. The accessory of claim 1 wherein a top side of the bracket comprises a logo.

7. The accessory of claim 6 wherein the logo is removeably attachable.

8. The accessory of claim 1 wherein the bottom side comprises a logo.

9. The accessory of claim 1 wherein the pad is about 3 inches from a first side to a second side and a first opposing channel wall is about 2 inches from a second opposing channel wall.

10. The accessory of claim 1 wherein the pad is formed from a resin with a resulting Shore A hardness that is greater than a Shore A hardness of the bracket.

* * * * *